United States Patent [19]

Matsumoto

[11] 4,127,326
[45] Nov. 28, 1978

[54] ELECTRIC SHUTTER

[75] Inventor: Kunio Matsumoto, Ageo, Japan

[73] Assignee: Copal Company Limited, Tokyo, Japan

[21] Appl. No.: 788,658

[22] Filed: Apr. 18, 1977

[30] Foreign Application Priority Data

Apr. 19, 1976 [JP] Japan .............................. 51-49109[U]
Aug. 21, 1976 [JP] Japan ........................... 51-112288[U]
Aug. 21, 1976 [JP] Japan ........................... 51-112289[U]

[51] Int. Cl.² .............................................. G03B 9/16
[52] U.S. Cl. .................... 354/234; 354/129; 354/258
[58] Field of Search ............... 354/133, 147, 234, 251, 354/256, 258, 267, 235

[56] References Cited

U.S. PATENT DOCUMENTS 3,722,392  3/1973  Kitai ................................ 354/258 X

*Primary Examiner*—Michael L. Gellner
*Attorney, Agent, or Firm*—Cushman, Darby & Cushman

[57] ABSTRACT

An electric shutter of a program type provided with a single actuating spring connected at one end with a shutter blade opening and closing lever and at the other end with a closing actuating member. One end of the actuating spring acts to open the shutter blades through the opening and closing lever and the other end acts to close the shutter blades through the closing actuating member and opening and closing lever so that the structure may be simplified and the shutter releasing operation may be made with a light force. A spring acting to press an armature lever against an electromagnet is so arranged as to lose its action when the closing actuating member is in an uncocked position. Further, this electric shutter is provided with a synchroswitch so arranged as to be closed after the lapse of a predetermined time after the shutter is released irrespective of the diaphragm aperture to be set so that a flash-photographing may be positively made.

3 Claims, 9 Drawing Figures

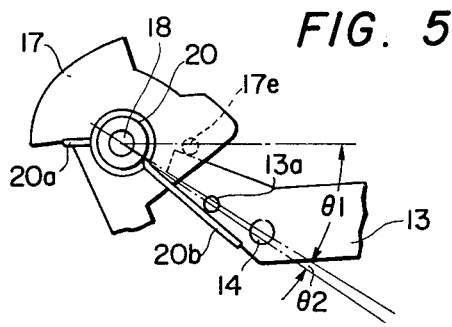
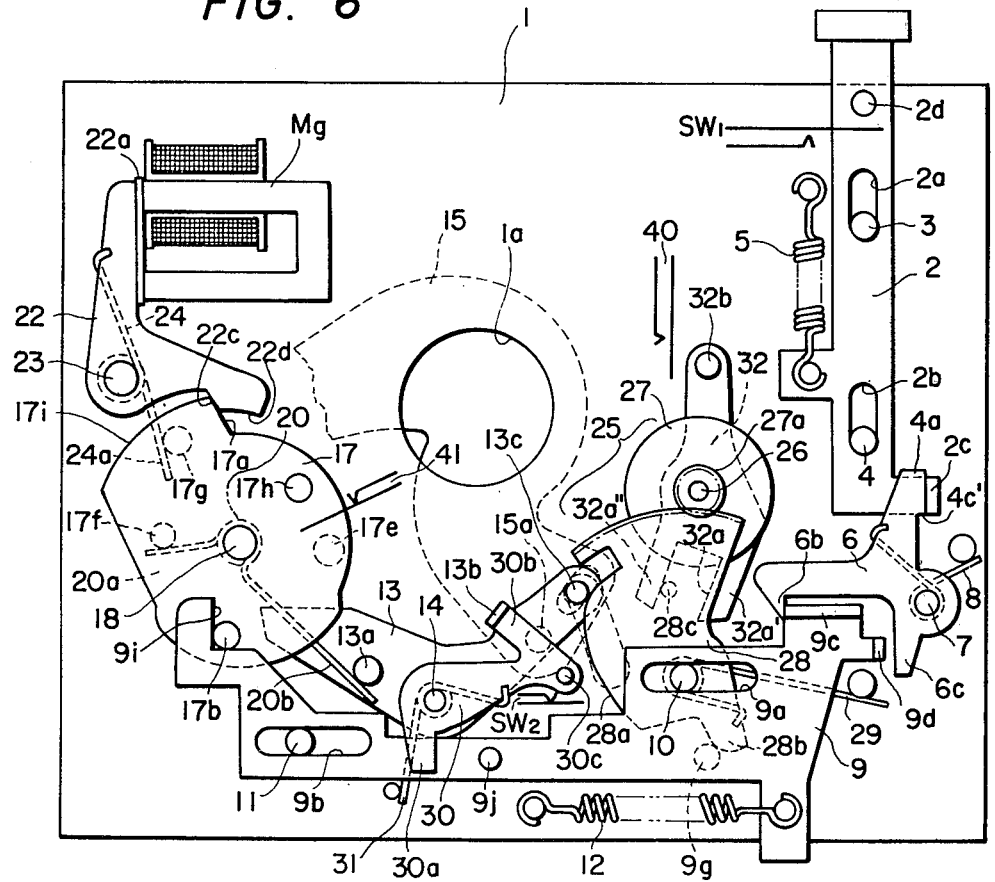

ELECTRIC SHUTTER

BACKGROUND OF THE INVENTION (a) Field of the Invention

The present invention relates to electric shutters and more particularly to improvements in an electric shutter of a program type.

(b) Description of the Prior Art

In a conventional electric shutter, as means of opening and closing shutter blades, a first actuating force source for opening the shutter blades and a second actuating force source for closing the shutter blades are provided separately from each other so as to be separately tensioned when the shutter is cocked. Therefore, when the shutter is released, first the shutter blades will be opened by the first actuating force source, then the closing member will be unlocked by the action of an electromagnet after the lapse of a proper exposure time by the action of a well known exposure time controlling circuit including CdS or the like and the shutter blades will be closed by the second actuating force source to complete one photographing. However, with such arrangement, there have been defects that, as the actuating force sources, for example, springs are arranged in two places, the arrangement is complicated and the strength of the second actuating force source must also be adjusted in response to the strength of the first actuating force source.

Further, in an electric shutter, in order that even a comparatively small magnetic force of an electromagnet may positively attract and hold an armature lever member, it is already suggested as disclosed in Japanese Utility Model Publication No. 24466/69 to keep a spring in the direction of being pressed in contact with the electromagnet acting on the armature lever member. However, there has been a defect that, after the electromagnet is de-energized, the shutter blade closing actuating member will have to move always against the spring force, the closing action will become unstable and the amount of exposure will fluctuate. On the other hand, it is suggested as disclosed in Japanese Utility Model Opening No. 62034/74 to displace the above mentioned spring to an independent position from the armature lever member by means of a releasing member. However, this has a defect that an increase in the releasing stroke and releasing force will result.

Particularly a blade opening and closing member in an electric shutter of a program type will operate in a predetermined entire range only when the diaphragm aperture is fully opened but will be returned from the course of the displacement otherwise. Therefore, for a photographing by using a flashing means, a synchroswitch has been made to be of a moving contact type in response to the diaphragm aperture or a flashing circuit has been made to be controlled through SCR by a de-energizing signal for the eltromagnet. However, there have been defects that the mechanism will be complicated and will not be properly operated at a low voltage.

SUMMARY OF THE INVENTION

Therefore, a primary object of the present invention is to provide an electric shutter wherein the structure is simple and, both at the time of an ordinary photographing and at the time of flash-photographing, a stabilized exposure will be always obtained.

According to the present invention, this object is attained by providing a single actuating spring connected at one end with a shutter blade opening and closing member and at the other end with a closing actuating member so that one end of the actuating spring may act to open the shutter blades through the shutter blade opening and closing member and the other end may act to close the shutter blades through the closing actuating member and the shutter blade opening and closing member.

According to a preferred embodiment of the present invention, a spring acting to press an armature lever against an electromagnet is so arranged as to lose its action when the closing actuating member is in an unlocked position so that the shutter releasing operation may be made with a light force.

According to another preferred embodiment of the present invention, in order that a flash-photographing may be positively made and a flashing means may not be accidentally flashed, a flash synchronizing control lever acting to close a synchroswitch only when a predetermined time elapses after the shutter is released is provided and an auxiliary switch connected in series with the synchroswitch and opened by an opening and closing actuating member when a closing actuating member moves to close the shutter blades is provided.

This and other objects of the present invention will become more apparent during the course of the following detailed description and appended claims.

BRIEF DESCRIPTION OF THE DRAWINGS

FIG. 5 is a partial plan view of FIG. 2;

FIG. 6 is a plan view showing another embodiment of a blade opening and closing mechanism as cocked of the electric shutter according to the present invention further including a flash synchronizing means;

DESCRIPTION OF THE PREFERRED EMBODIMENTS

Figure 1:
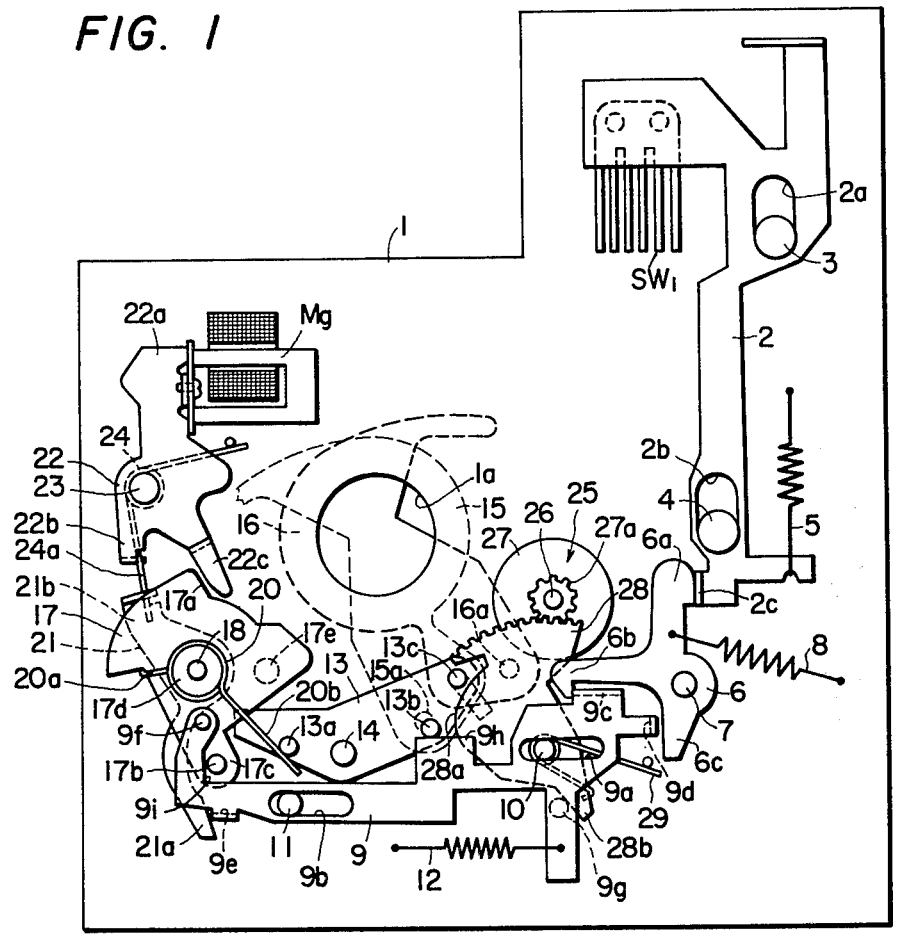
FIG. 1 is a plan view showing an embodiment of a blade opening and closing mechanism as cocked of an electric shutter according to the present invention.

In FIG. 1, reference numeral 1 indicates a shutter base plate having an exposure aperture 1a formed therein. Numeral 2 indicates a release plate having slots 2a and 2b and a bend 2c formed therein, fitted so that the slots 2a and 2b may slidably fit respectively to pins 3 and 4 erected on the shutter base plate 1 and biased upward by a spring 5. Numeral 6 indicates a release locking lever having arms 6a, 6b and 6c. The arms 6a and 6b are hook-shaped. The release locking lever 6 is rotatably supported by a shaft 7 erected on the shutter base plate 1 and biased clockwise by a spring 8 but is prevented from moving by the contact of the side of the tip of the arm 6 with the bend 2c of the release plate 2. Numeral 9 indicates a cocking plate having slots 9a and 9b and bends 9c, 9d and 9e, fitted so that the slots 9a and 9b may slidably fit respectively to the pins 10 and 11 erected on the shutter base plate 1 and biased leftward by a spring 12 but prevented from moving by the engagement of the bend 9c with the hook portion of the arm 6b of the release locking lever 6. The cocking plate 9 has a pin 9f erected at the left end, a pin 9g erected on the back side and acting sides 9h and 9i. Numeral 13 indicates a blade opening and closing lever having pins 13a, 13b and pin 13c erected thereon, rotatably supported by a shaft 14 erected on the shutter base plate 1 and biased clockwise by being the pin 13a pushed by an acting arm 20b of a coil spring 20 serving as an actuating source but prevented from moving by the contact of the pin 13b with the acting side 9h of the cocking plate 9. The pin 13c slidably fits in the slots of a pair of shutter blades 15 and 16 on the back side of the shutter base plate 1 so that, when the pin 13c reciprocally rocks with the shaft 14 as a center, the shutter blades 15 and 16 will reciprocally rotate with the shafts 15a and 16a erected on the shutter base plate 1 as respective centers. Numeral 17 indicates a closing actuating member having an acting side 17a, an arm portion 17c provided with a pin 17b and a circular projection 17d having a shaft hole formed, having a pin 17e on the back side, supported rotatably by a shaft 18 erected on the shutter base plate 1 and biased clockwise by an acting arm 20a of a coil spring 20 but prevented from moving by the contact of the pin 17b with the acting side 9i of the cocking plate 9. The coil spring 20 is loosely wound with its coil portion by proper turns on the outer periphery of the circular projection 17d of the actuating member 17. Numeral 21 indicates a holding lever having an arm 21a and an arm 21b having a bend at the tip formed, supported rotatably by the shaft 18 and biased counterclockwise by an arm portion 24a of a coil spring 24 but prevented from moving by the contact of the side of the arm 21a with the bend 9e of the cocking plate 9. Numeral 22 indicates an armature lever having arms 22a, 22b and 22c, supported rotatably by a shaft 23 erected on the shutter base plate 1 and biased clockwise by the coil spring 24 but prevented from moving by the contact of the arm 22a with a controlling electromagnet Mg. Numeral 25 indicates a governor means formed of a flywheel 27 pivoted on a shaft 26 provided on the base plate 1, a pinion 27a concentric and integral with it and a sector gear 28 meshed with the pinion 27a so that, when the pin 13c of the blade opening and closing lever 13 engages with a cam surface 28a of the sector gear 28, the operation of opening the shutter blades 15 and 16 may be made at a comparatively low speed. The sector gear 28 is rotatably supported by the shaft 10 and is biased clockwised by a spring 29 but is prevented from moving by the contact of an arm 28b with the pin 9g of the cocking plate 9.

The operation shall be explained in the following.

Figure 2:
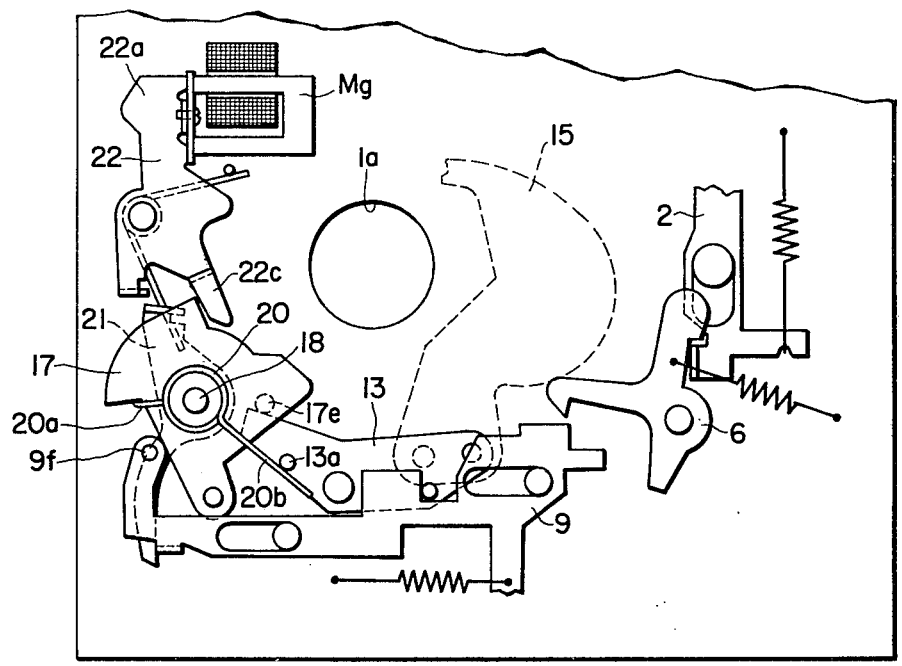
FIG. 2 is a plan view of an essential part of the mechanism in FIG. 1 as the shutter blades are opened.

When the release plate 2 is pushed downward from the cocked state in FIG. 1, by its initial operation, a switch SW$_1$ will be closed (as shown by the two-point chain line in FIG. 4), the electromagnet Mg will be excited to attract and hold one end of the arm 22a of the armature lever 22. When the release plate 2 is further pushed, the release locking lever 6 will rotate clockwise to unlock the cocking plate 9 which will begin to move quickly leftward. Therefore, the sector gear 28 will begin to rotate clockwise at a low speed. On the other hand, the clockwise rotation of the closing actuating member 17 will become possible but will be prevented by the contact of the acting side 17a with the arm 22c of the already attracted and held armature lever 22. Very slightly later than the above described operation, the pin 13b of the blade opening and closing lever 13 will slide on the acting side 9h. When it separates from the acting side 9h, the blade opening and closing lever 13 will be pushed to rotate clockwise by the acting arm 20b of the coil spring 20 and will rotate the shutter blades 15 and 16 with the pin 13c to open the exposure aperture 1a to begin an exposure. (FIG. 2). At this time, the opening motion of the shutter blades 15 and 16 will be made at a comparatively low speed, because the pin 13c will move while being regulated by the cam surface 28a. On the other hand, with the leftward movement of the cocking plate 9, in the final stroke, the pin 9f will open the switch SW$_2$ (as shown by the two-point chain line in FIG. 4) to activate the exposure time controlling circuit in FIG. 4. After the lapse of a delaying time determined by this controlling circuit after the shutter blades 15 and 16 begin the opening operation, the controlling electromagnet Mg will be de-energized to release the armature lever 22. Therefore, the closing actuating member 17 will be rotated clockwise by the acting arm portion 20a of the coil spring 20, the pin 17e will push the blade opening and closing lever 13 to rotate it counterclockwise to close the shutter blades 15 and 16 and thus one photographing will be completed (FIG. 3).

Figure 3:
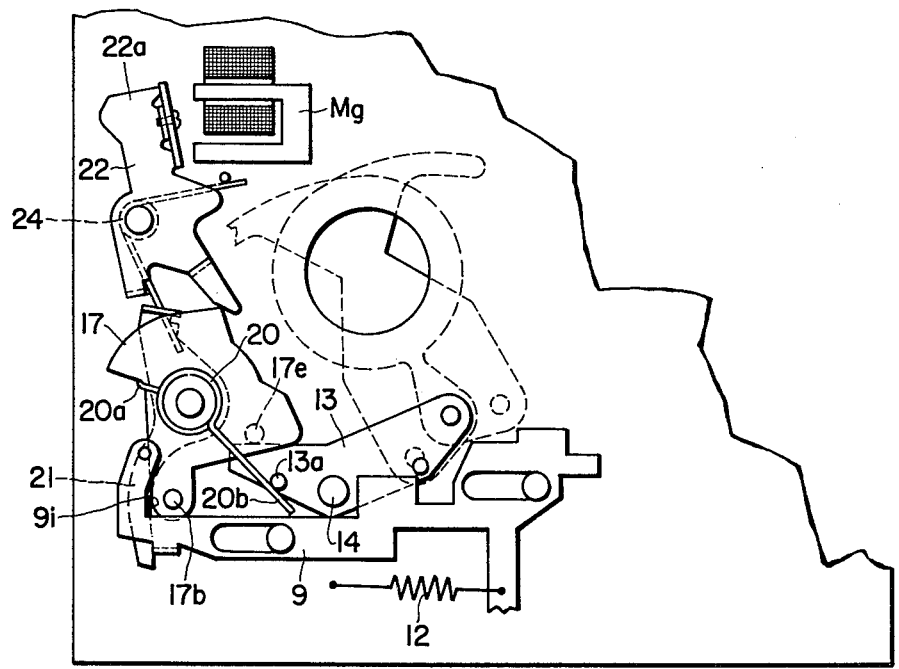
FIG. 3 is a plan view of an essential part of the mechanism in FIG. 1 as uncocked (as the exposure ends)

Now, if the cocking plate 9 is moved rightward against the tension of the spring 12 from the state in FIG. 3, the pin 17b will be pushed by the acting side 9i to rotate the closing actuating member 17 counterclockwise, the coil spring 20 will be wound up and the shutter will be cocked. In the same manner, the holding lever 21 will be rotated counterclockwise by the coil spring 24 and the armature lever 22 will rotate clockwise to bring the state in FIG. 1.

Here the operation of the coil spring 20 shall be detailed. In FIG. 1, the pin 13a is deflected from the line connecting the shafts 18 and 14, on the other hand, the acting arm 20b of the coil spring 20 is longer than the acting arm 20a of the same and the force of the arm 20a to tend to rotate the closing lever 17 is larger than the force of the arm 20b to push the pin 13a. However, in the initial period of the shutter release, the closing actuating member 17 will be restrained by the armature lever 22 and therefore the pin 13a will be pushed by the arm 20b to rotate the blade opening and closing lever 13 to open the shutter blades (FIG. 2). In the step of shifting from the state in FIG. 2 to the state in FIG. 3, as the force of the pin 17e pushing the blade opening and closing lever 13 with the acting arm 20a is larger than the force of pushing the blade opening and closing lever 13 with the arm 20b and the distance from the shaft 14 to the point of being pushed by the pin 17e is longer than the distance from the shaft 14 to the pin 13a, the closing actuating member 17 will be rotated clockwise by the acting arm 20a of the coil spring 20 from the state shown in FIG. 5 and, with the force to keep the balance of the rotating forces when the angles $\theta 1$ and $\theta 2$ become equal to each other, the pin 17e will counterclockwise rotate the blade opening and closing lever 13 to close the shutter blades 15 and 16.

By the way, in the above description, the shutter blades 15 and 16 are also diaphragm blades. But the number and operating system of the blades are not limited to those in the embodiment.

The fundamental arrangement and operation of the electric shutter according to the present invention have been described in the above with reference to FIGS. 1 to 5. Another embodiment of the present invention shall be explained in the following with reference to FIGS. 6 to 9. In this embodiment, the same numerals are given respectively to the same or similar parts as in the embodiment in FIG. 1 and the explanations of the parts duplicating those in FIG. 1 shall be omitted.

The embodiment shown in FIG. 6 is different from the embodiment in FIG. 1 first in respect that the holding lever 21 is eliminated. That is to say, the closing actuating member 17 is further provided with pins 17f, 17g and 17h in addition to the pins 17b and 17e. The pin 17f engages with the acting arm 20a of the coil spring 20. The pin 17g engages with one end 24a of the spring 24. The pin 17h serves to open and close a later described auxiliary switch 41. A peripheral surface 17i engageable with an arcuate surface 22d formed at the tip of the armature lever 22 is further formed on the closing actuating member 17. The acting side 9h of the cocking plate 9 is eliminated. Instead of it, an opening release lever 30 is rotatably mounted on the shaft 14. The opening release lever 30 is biased counterclockwise by a spring 31 and has an arm 30a engageable with a pin 9j erected on the cocking plate 9, an arm 30b engageable with the bend 13b formed on the blade opening and closing lever 13 and a pin 30c for opening and closing the switch SW$_2$. It is different from the embodiment in FIG. 1 further in respect that a flash synchronizing control lever 32 is provided as related with the governor means 25. That is to say, the control lever 32 is mounted rotatably on the shaft 26 and has a fork-shaped portion 32a operated by a pin 28c erected on the sector gear 28 and a pin 32b serving to open and close a later described flash synchronizing switch 40.

Figure 4:
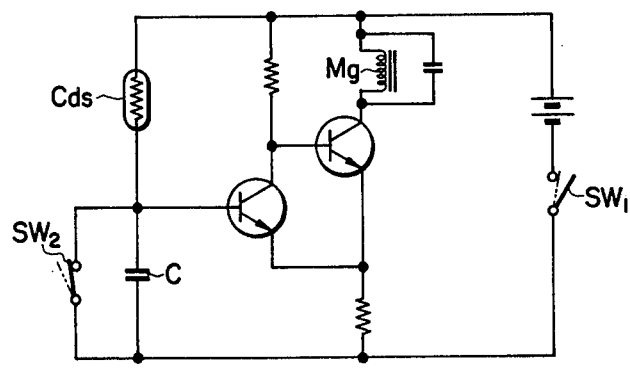
FIG. 4 is a wiring diagram showing an example of an exposure time controlling circuit made to cooperate with the blade opening and closing mechanism shown in FIG. 1.
Figure 7:
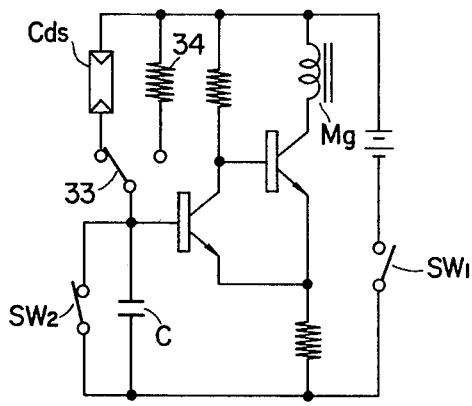
FIG. 7 is a wiring diagram showing an example of an exposure time controlling circuit made to cooperate with the blade opening and closing mechanism shown in FIG. 6.

The circuit shown in FIG. 7 is fundamentally the same as the circuit in FIG. 4 but is different from the one in FIG. 4 in respect that, instead of the photoconductive element CdS, a resistor 34 is so arranged as to be connected with the capacitor C by a change-over switch 33. That is to say, the resistor 34 has the resistance value selected so as to serve to determine a specific exposure time adapted to a flash-photographing together with the capacitor C. The change-over switch 33 will be connected with the photoconductive element CdS side as shown in FIG. 7 when a later described switching ring 42 (FIG. 9) rotatable concentrically with the exposure aperture 1a is set in a position "AUTO" but will be connected with the resistor 34 side when the switching ring 42 is set in a position "FLASH."

Figure 8:
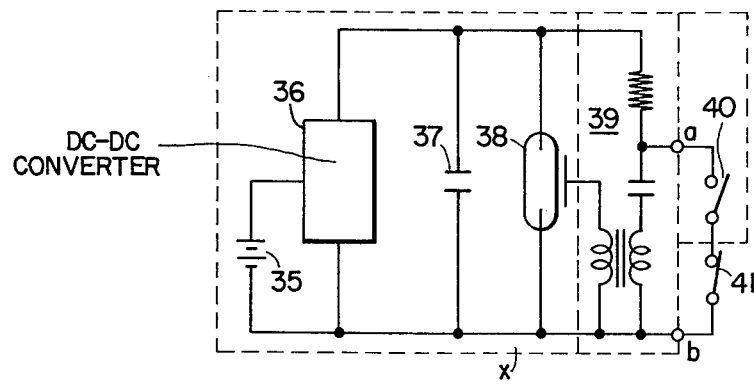
FIG. 8 is a wiring diagram showing an example of a flashing circuit made to cooperate with the blade opening and closing mechanism shown in FIG. 6.

In FIG. 8, symbol X indicates a well known flash synchronizing ignition circuit consisting a DC-DC converter 36, a main capacitor 37, a discharge tube 38, a trigger circuit 39 and the synchroswitch 40. The auxiliary switch 41 is connected in series with the synchroswitch 40.

Figure 9:
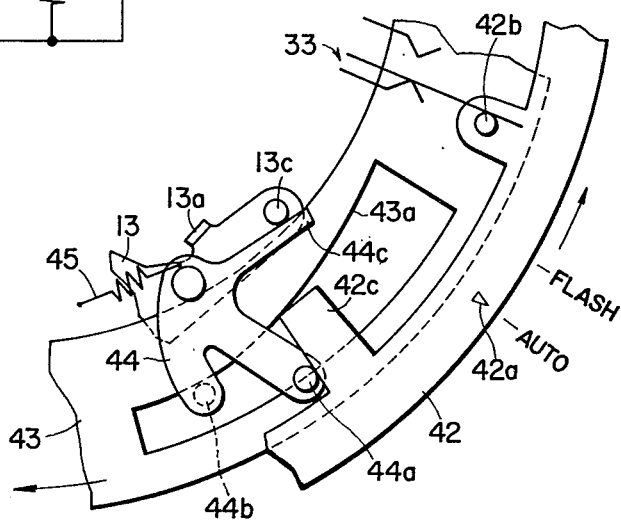
FIG. 9 is a partial plan view showing a mechanism related with the blade opening and closing lever in FIG. 6 and a photographing distance adjusting member of a camera.

By the way, the diaphragm aperture at the time of a flash-photographing is determined in response to the photographing distance. The mechanism for such purpose is arranged, for example, as shown in FIG. 9. That is to say, the switching ring 42 is provided with an index 42a to be set in the positions "AUTO" and "FLASH," a pin 42b for operating the change-over switch 33 and a projection 42c. Numeral 43 indicates an adjusting ring for setting a photographing distance rotatable concentrically with the exposure aperture 1a and having a cam surface 43a formed therein. Numeral 44 indicates a flash lever which is supported rotatably on a member integral with the shutter base plate 1 and has a pin 44a engageable with the projection 42c of the switching ring 42, a pin 44b engaged with the cam surface 43a of the distance adjusting ring 43 and an arm 44c capable of being located in the track of the pin 13c of the blade opening and closing lever 13. Numeral 45 indicates a spring biasing the flash lever 44 counterclockwise. When the switching ring 42 is rotated in the direction indicated by the arrow in FIG. 9 to set the index 42a in the position "FLASH," the change-over switch 33 will be switched to the resistor 34 side by the pin 42b and the flash lever 44 will become rotatable counterclockwise. Therefore, in this state, if the distance adjusting ring 43 is rotated in the direction indicated by the arrow in FIG. 9 in response to the photographing distance, the flash lever 44 will rotate counterclockwise in response to it to vary the range of movement of the blade opening and closing lever 13 when the shutter is released. Thus the diaphragm aperture will be determined in response to photographing distance at the time of the flash-photographing.

The embodiment in FIG. 6 is operated substantially the same as in the case of the embodiment in FIG. 1. Therefore, the detailed explanation of the operation shall be omitted. Only the operating part not explained with reference to FIG. 1 shall be explained in the following.

While the cocking plate 9 moves leftward when the release plate 2 is pushed down, the pin 9j will hit the arm 30a and will clockwise rotate the opening release lever 30 against the tension of the spring 31. Therefore, with the clockwise rotation, the lever 30 will release the blade opening and closing lever 13, will open the switch SW$_2$ with the pin 30c and will begin the operation of the exposure time controlling circuit.

By the way, the time required from the beginning to the end of the clockwise rotation of the sector gear 28, that is, the time of duration of the motion of the governor means 25 is set, for example, to be 1/60 second. On the other hand, the resistance value of the resistor 34 and the capacity of the capacitor C are so selected that the delaying time determined by the resistor 34 and capacitor C may be 1/30 second which is longer than that.

The operation in the case of making a flash-photographing shall be explained in the following.

First, when the plug of the flashing means is inserted into a synchrosocket of a camera not illustrated, due to the connection of the contacts a and b, the flash synchronizing ignition circuit in FIG. 8 will be prepared for the operation. Then, when the switching ring 42 is set in the position "FLASH" from the position "AUTO," the change-over switch 33 in FIG. 7 will be switched to the resistor 34 side from the photoconductive element CdS side. On the other hand, the flash lever 44 will become displaceable. When the photographing distance is set by the adjusting ring 43, in response to it, the arm portion 44c of the flash lever 44 will come into the track of the movement of the pin 13c of the blade opening and closing lever 13. There, if the releasing operation is made, the blade opening and closing lever 13 will first rotate clockwise following the motion of the sector gear 28 but, at a time, the pin 13c will stop by contacting the arm portion 44c of the flash lever 44 and, as a result, the shutter blades 15 and 16 will form a diaphragm aperture corresponding to the photographing distance. Thereafter, in the final range of its clockwise rotation, the sector gear 28 will push one leg 32a' of the fork-shaped portion 32a to rotate the synchrocontrol lever 32 counterclockwise. Thereby, the pin 32b will close the synchroswitch 40. As a result, the discharge tube 38 will be flashed by the discharge of the main capacitor 37 accompanying the operation of the trigger circuit 39 to make a flash-photographing. Further, thereafter, after the lapse of a delaying time determined by the resistance value of the resistor 34 and the capacity value of the capacitor C, if the electromagnet Mg is de-energized, by the same operation as is described above, the shutter blades 15 and 16 will be closed and, during the clockwise rotation of the closing actuating member 17, the pin 17h will open the auxiliary switch 41.

In the case of the cocking operation, if the cocking plate 9 is moved rightward, the pin 9g will first push the arm 28b to rotate the sector gear 28 counterclockwise. At this time, the synchrocontrol lever 32 will be pushed by the opening spring force of the synchroswitch 40 with the escape of the pin 28c from one leg 32a', will rotate clockwise to some time point and will stop once. In the final range of the counterclockwise rotation of the sector gear 28, the other leg 32a" will be pushed by the pin 28c and the lever 32 will again rotate clockwise and will be brought to the illustrated state. On the other hand, after the sector gear 28 begins to rotate counterclockwise, the arm 9i will catch the pin 17b and will rotate the closing actuating member 17 counterclockwise. After the synchroswitch 40 is opened, the pin 17h will escape from the auxiliary switch 41 and the switch 41 will be thereby closed. By the way, the operation of opening and closing the auxiliary switch 41 may be made not only as in the embodiment but also by the movement of the armature lever 22. Further, in this embodiment, in the state that the closing actuating member 17 is locked by the illustrated cocking plate 9, the side 17a is in contact with the hook portion 22c of the armature lever 22. But the closing actuating member 17 may be locked in a position slightly rotated counterclockwise from the illustrated state so that the side 17a may be separated more or less from the hook portion 22c.

I claim:

1. An electric shutter comprising a shutter base plate, a cocking plate member supported so as to be movable between its cocked position and its uncocked position on said shutter base plate, a blade opening and closing lever member supported rotatably on said shutter base plate and operatively connected with said cocking plate member, a closing actuating member supported movably between its cocked position and its uncocked position on said base plate and engageable with said cocking plate member and blade opening and closing lever member, an armature lever member supported rotatably on said base plate and capable of holding said closing actuating member in its cocked position, an electromagnet installed on said base plate and capable of attracting said armature lever member to hold said closing actuating member in its cocked position, and an exposure time controlling circuit connected to said electromagnet, said blade opening and closing lever member being moved to open shutter blades when said cocking plate member is moved from the cocked position to the uncocked position by the shutter release, and said blade opening and closing lever member being moved to close the shutter blades by said closing actuating member moving from the cocked position to the uncocked position when a time determined by said exposure time controlling circuit has elapsed, characterized in that a single spring is provided between said blade opening and closing lever member and said closing actuating member, said spring comprising a coil spring having a coil portion arranged substantially concentrically with a base plate-mounted supporting shaft of said closing actuating member, said blade opening and closing lever member being actuated by one end of said spring, and said closing actuating member being actuated by the other end of said spring, the spring being further arranged such that the force for actuating said closing actuating member is larger than the force for actuating said blade opening and closing lever member.

2. An electric shutter according to claim 1 wherein a spring is provided between said closing acutating member and said armature lever member and is so arranged as to act to press said armature lever member against said electromagnet when said closing actuating member is held in the cocked position and to serve as an auxiliary actuating force for said closing actuating member when said closing actuating member moves from its cocked position to its uncocked position.

3. An electric shutter according to claim 1 wherein said electric shutter further comprises a governer means operatively connected with said cocking plate member to regulate the moving speed of said blade opening and closing lever member, a flash lever member supported rotatably substantially on said base plate and capable of coming into the moving track of said blade opening and closing lever member to vary the displacement of said blade opening and closing lever member in response to the photographing distance in a flash-photographing, a switching means connected with said exposure time controlling circuit to make the time determined by said circuit in a flash-photographing longer than the time of duration of the operation of said governor means, a synchroswitch for a flashing circuit arranged as related with said governor means and capable of being closed in the final stage of the movement of the said governor means, and an auxiliary switch connected in series with said synchroswitch and opened by said closing actuating member when said closing actuating member moves from its cocked position to its uncocked position.

* * * * *